Patented Apr. 17, 1945

2,373,782

UNITED STATES PATENT OFFICE 2,373,782

PREPARATION OF POLYVINYL ETHERS

Robert Albert Scheiderbauer, Kenmore, N. Y., assignor to E. I. du Pont de Nemours & Company, Wilmington, Del., a corporation of Delaware No Drawing. Application July 22, 1943,
Serial No. 495,777

7 Claims. (Cl. 260—90)

This invention relates to polyvinyl alkyl ethers. More particularly, it relates to a simple and easily controlled process for the preparation of high molecular weight, water-insoluble polyvinyl alkyl ethers.

Polyvinyl alkyl ethers are generally prepared by the polymerization of monomeric alkyl vinyl ethers, the polymerization generally being conducted in the presence of a polymerization catalyst such as boron fluoride, sulfur dioxide, etc. However, the polymeric materials thus obtained are generally of low molecular weight. Films, threads and other shaped articles prepared from them do not possess sufficient toughness or strength to make them desirable for most purposes.

It has also been proposed to prepare alkyl polyvinyl ethers of desirably high molecular weight by the etherification of high molecular weight polyvinyl alcohols obtained by the saponification of highly polymerized vinyl acetate. According to these proposals, the polyvinyl alcohol is treated with an aqueous solution of an alkali metal hydroxide, such as sodium hydroxide, to form the sodium alcoholate of polyvinyl alcohol, this alcoholate being subsequently treated with an alkyl halide such as ethyl bromide. Although the resulting ethers possess a desirably high molecular weight the extent of etherification is generally quite low and the products are usually soluble in hot water. For this reason they are undesirable for use in the manufacture of many articles.

It is, therefore, an object of this invention to provide a simple, easily controlled process for the preparation of water-insoluble polyvinyl alkyl ethers that are suited for use in the manufacture of tough, durable film, tubes, and other shaped articles.

The objects of this invention are achieved in general by treating polyvinyl alcohol (having a molecular weight of at least 8,000) dissolved in liquid ammonia with an alkali metal such as metallic sodium, dissolved in liquid ammonia to form the alkali metal alcoholate of polyvinyl alcohol and then treating the alcoholate in the presence of liquid ammonia with an alkyl halide such as ethyl bromide. The liquid ammonia is allowed to evaporate and the polyvinyl ether obtained is purified and dried. It is of high molecular weight and is insoluble in both hot and cold water. It is readily adapted for use in the manufacture of shaped articles that are both tough and strong.

The presence of liquid ammonia as a reaction medium for the reaction of the alkyl halide and the alkali metal alcoholate of the polyvinyl alcohol is critical to the invention. If liquid ammonia is not present, for example, if the reactants are mixed in the presence of an inert liquid such as benzene, no appreciable reaction occurs and the desired polyvinyl alkyl ether is not obtained.

The following example illustrates the preparation of a typical polyvinyl alkyl ether in accordance with the principles of this invention. Parts are by weight unless otherwise indicated.

Example

Forty-four parts of polyvinyl alcohol obtained by the substantially complete hydrolysis of polyvinyl acetate were dissolved in about 695 parts of liquid ammonia contained in a Dewar type vessel. When completely dissolved, the solution was gradually added to a blue colored solution of metallic sodium (23 parts) dissolved in 350 parts of liquid ammonia contained in a second Dewar type vessel. The reaction mixture was slowly stirred and when the addition was completed, the blue color of the sodium solution had disappeared and a white, hard solid comprising the sodium alcoholate of polyvinyl alcohol had precipitated. A solution of 278 parts of ethyl bromide dissolved in about 350 parts of liquid ammonia was then added and the mixture stirred until the white solid had disappeared. The solution was then allowed to stand until the liquid ammonia had evaporated.

The reaction mixture remaining was then poured into water. A straw-colored rubbery mass was obtained which was removed from the water, heated in boiling water made slightly acid with glacial acetic acid, and finally extracted with fresh boiling water until the extract was neutral. The mass was then dissolved in a mixture of 30 parts acetone and 70 parts water, filtered from undissolved solid material and reprecipitated by the addition of water. The precipitated mass was dried at 60° C. The polyvinyl ethyl ether so obtained was insoluble in both hot and cold water but was sensitive to and swollen by water. Analysis showed that approximately 20% of the available hydroxyl groups of the polyvinyl alcohol had been etherified (ethoxy content of 17%). The material was readily soluble in mixtures of acetone and water and solutions of it could be formed into strong, tough, transparent films that were eminently suited for use as wrapping tissues, etc.

The above example sets forth the preferred method of forming polyvinyl alkyl ethers in accordance with the principles of this invention.

However, it is obvious that many modifications and substitutions can be made in the preferred method without departing from these principles. For example, it is not necessary that all of the reagents employed be first dissolved in liquid ammonia. Thus the alkali metal and alkyl halide can be added successively to a solution of polyvinyl alcohol dissolved in liquid ammonia, care being taken to insure that all of the alkali metal has reacted with the polyvinyl alcohol (absence of blue color in liquid ammonia solution) before the alkyl halide is added. Or, the solid polyvinyl alcohol can be added directly to a solution of alkali metal and liquid ammonia, the alkyl halide being again added to the reaction mixture only after the disappearance of the blue color.

Likewise the invention is not limited to the preparation of the ethyl ether of polyvinyl alcohol but comprehends rather the formation of ethers from polyvinyl alcohol and any eitherifying agent that is substantially inert to liquid ammonia at the temperature employed. Suitable etherifying agents include the alkyl, aralkyl or alkylene halides, sulfates or sulfonates. However, the halides are preferred because of their lesser tendency to take part in undesirable secondary reactions with the liquid ammonia present in the reaction mixture. The halide may comprise the bromide, chloride or idodide; however, the bromide is preferred. Suitable etherifying agents include methyl bromide, benzyl bromide and allyl chloride. It is, of course, understood that the etherifying agent can if desired contain additional groups, such as the nitro, nitroso, amino, carboxylate, etc., which are substantially inert to liquid ammonia at the temperature employed to form polyvinyl ethers containing substituted groups capable of imparting special properties to the ethers and of undergoing subsequent reaction. For example, if the etherifying agent comprises sodium chloroacetate, the resulting ether can be subsequently esterified.

Obviously, too, the relative proportions of reagents can be varied somewhat to obtain polyvinyl ethers having different degrees of substitution. However, in all cases the amount of polyvinyl alcohol employed must be at least equivalent to the amount of alkali metal used so as to insure the absence of the free metal in the alcoholate to be reacted with the alkylating agent. The reactivity of the alkali metals is well known and the presence of any large amount of the free metal in the product at this point would present a safety hazard. Such a presence of the free metal will, of course, be indicated by a blue color in the liquid ammonia solution.

The present invention has been discussed primarily from the standpoint of the etherification of those polyvinyl alcohols that are prepared by the substantially complete hydrolysis of polyvinyl acetate. However, the invention is not so limited, but is also applicable in the etherification of those polyvinyl compounds that in addition to free hydroxyl groups, also contain other substituent groupings, such as halogen, ether, acetal, etc., which groupings are stable in the presence of liquid ammonia and under the conditions of the invention. Suitable compounds for use with the invention include the lowly substituted ethers or acetals of polyvinyl alcohol, such as for example, polyvinyl ethyl ether having an ethoxy content of 10% or polyvinyl butyral having a butyral content of 10%. Other suitable compounds include those prepared by the copolymerization and subsequent hydrolysis of vinyl esters with other polymerizable substances such as for example, vinyl halides, unsaturated hydrocarbons, etc.

This invention provides a simple and easily controlled process for the direct etherification of polyvinyl alcohol. The process is readily adapted to the preparation of alkyl or even aralkyl ethers of polyvinyl alcohol of any desired alkyl or aralkyl content. The process is especially adapted to the preparation of alkyl polyvinyl ethers that are sufficiently highly substituted to render them insoluble in both hot and cold water, which ethers are eminently suited for use in the manufacture of shaped articles that possess the desirable strength and toughness.

It will be apparent from the above description that the process of this invention is susceptible to extensive modification and variation without departing from the spirit and scope of the invention as defined in the appended claims, and it is to be understood, therefore, that the invention includes all such modifications and variations.

I claim:

1. A process which comprises reacting an alkyl halide with an alkali metal alcoholate of a polyvinyl alcohol in liquid ammonia as the reaction medium, whereby to form the corresponding polyvinyl alkyl ether, and isolating said ether.

2. A process which comprises reacting an alkali metal with at least an equivalent amount of polyvinyl alcohol in liquid ammonia whereby to form an alkali metal alcoholate of polyvinyl alcohol, and thereafter reacting said alcoholate with an alkyl halide in liquid ammonia whereby to form the corresponding polyvinyl alkyl ether.

3. A process which comprises reacting metallic sodium with at least an equivalent amount of polyvinyl alcohol having a molecular weight of at least 8,000 in liquid ammonia whereby to form the sodium alcoholate of polyvinyl alcohol, and thereafter reacting said alcoholate with an alkyl halide in liquid ammonia whereby to form the corresponding polyvinyl alkyl ether.

4. A process which comprises reacting an alkali metal with at least an equivalent amount of polyvinyl alcohol having a molecular weight of at least 8,000 in liquid ammonia whereby to form an alkali metal alcoholate of polyvinyl alcohol, and thereafter reacting said alcoholate with an alkyl bromide in liquid ammonia whereby to form the corresponding polyvinyl alkyl ether.

5. A process which comprises reacting metallic sodium with at least an equivalent amount of polyvinyl alcohol having a molecular weight of at least 8,000 in liquid ammonia whereby to form the sodium alcoholate of polyvinyl alcohol, and thereafter reacting said alcoholate with ethyl bromide in liquid ammonia whereby to form polyvinyl ethyl ether.

6. A process for the preparation of polyvinyl alkyl ether which comprises dissolving polyvinyl alcohol in liquid ammonia, adding to the resulting solution an amount of alkali metal less than the equivalent of the polyvinyl alcohol whereby to form the alkali metal alcoholate of polvinyl alcohol, thereafter adding to said alcoholate in liquid ammonia an alkyl halide, evaporating the liquid ammonia, and isolating from the residue polyvinyl alkyl ether.

7. The process according to claim 6 wherein the alkali metal is sodium and the alkyl halide is ethyl bromide.

ROBERT A. SCHEIDERBAUER.